United States Patent [19]

Adams et al.

[11] Patent Number: 4,561,675
[45] Date of Patent: Dec. 31, 1985

[54] AUTO IGNITION DEVICE

[75] Inventors: Gary V. Adams, Perry; Wilbur J. Ahlf, Ogden; George F. Kirchoff; Rholand E. Lange, both of Brigham City, all of Utah

[73] Assignee: Morton Thiokol, Inc., Chicago, Ill.

[21] Appl. No.: 595,803

[22] Filed: Apr. 2, 1984

[51] Int. Cl.[4] ............................................. B60R 21/00
[52] U.S. Cl. .................................. 280/734; 280/736; 280/741
[58] Field of Search ............... 280/728, 734, 735, 736, 280/740, 741

[56] References Cited

U.S. PATENT DOCUMENTS

| 4,203,787 | 5/1980 | Kirchoff et al. | 252/181.4 |
| 4,296,084 | 10/1981 | Adams et al. | 423/351 |
| 4,369,079 | 1/1983 | Shaw | 280/728 |

FOREIGN PATENT DOCUMENTS 2755649 6/1978 Fed. Rep. of Germany ...... 280/734

Primary Examiner—Joseph F. Peters, Jr.
Assistant Examiner—Kenneth R. Rice
Attorney, Agent, or Firm—Gerald K. White

[57] ABSTRACT

The pyrotechnics in an air cushion inflator are caused to function by the auto ignition device when the device is subjected to a high temperature environment, such as a bonfire, at a temperature of 350° F. (177° C.) in place of in the 650° F. (343° C.) range which would occur if there were no auto ignition device. This enables the use of aluminum for the inflator housing, thereby to minimize weight, the aluminum having sufficient high temperature properties to contain the internal auto ignition pressures at 350° F. (177° C.) but not at 650° F. (343° C.).

8 Claims, 4 Drawing Figures

AUTO IGNITION DEVICE

BACKGROUND OF THE INVENTION

1. Field of the Invention

This invention relates to an improvement in inflators that are designed to lower internal pressure capability in order to minimize weight such as inflators that utilize aluminum in place of steel in the construction of the casing or housing.

2. Description of the Prior Art

Many forms of inflators for the inflation of inflatable crash protection or "air bag" restraint systems are known in the prior art. One form of such inflators utilizes a solid fuel gas generant composition for the generation of the inflating gas and includes as main component parts an annular reaction or combustion chamber which is bounded by inner and outer casing or housing structures, as disclosed, for example, in U.S. Pat. No. 4,296,084, granted to G. V. Adams and F. E. Schneiter and assigned to the assignee of the present invention.

Such gas generators or inflators must be constructed to withstand enormous thermal and mechanical stresses for a short period during the gas generation process. Thus, inflators that have been and are currently being used to fill automobile or other vehicle crash bags are fabricated using steel for the casing and other housing structural components, with the structural components being joined together by screw threads, roll crimping or welding.

Recent emphasis on weight reduction in automobiles has created a need for a lighter weight crash bag inflation system. It has been determined that significant weight reduction in the inflator can be achieved by the utilization of aluminum for the steel housing and other structural components. A form of inflator that utilizes aluminum for the housing structure is disclosed and claimed in the copending application entitled "INERTIA WELDED INFLATOR" bearing Ser. No. 595,774, filed on April 2, 1984 by Wilbur J. Ahlf, Gary V. Adams, Donald J. Cunningham and Daniel P. Dahle. That application is assigned to the assignee of the present invention. The disclosure thereof, by reference, is incorporated herein.

The housing construction of the Ahlf et al. "INERTIA WELDED INFLATOR" includes first and second aluminum structural components, specifically, a diffuser shell and a base shell. The diffuser shell and the base shell are welded together in a single inertia welding operation to form igniter, combustion and filtering chambers, the assembly being welded in a wholly loaded condition.

A problem is encountered when inflators utilizing aluminum for the housing construction are subjected to a high temperature environment such as a bonfire. This problem stems from the fact that at a temperature in the 650° F. (343° C.) range the pyrotechnics of the inflator automatically ignite. In this temperature range, for convenience termed the "auto ignite" temperature, the aluminum of the housing structure degrades and tends to rupture or burst, sending pieces and fragments flying in all directions. This problem is not encountered with inflators that employ steel in the housing structure since steel does not degrade until a much higher temperature of about 1100° F. (593° C.) is reached. The use of aluminum in an inflator, in place of steel to minimize weight, thus results in a lower inflator internal pressure capability. This lower internal pressure capability could be hazardous in a high temperature environment such as the inflator might be subjected to in the event of fire whether in storage, being shipped, or installed in a vehicle.

Thus, there is a need and a demand in such inflators that have housing structures that are designed to a lower internal pressure capability in order to minimize weight for a solution to this problem.

SUMMARY OF THE INVENTION

An object of the invention is to provide a solution to the foregoing problem.

Another object of the invention is to provide, in combination with an inflator, the casing or housing of which is structured to a lower internal pressure capability in order to minimize weight such as by the use of aluminum in place of steel, a safety device that is operative to cause the inflator pyrotechnics to function when the device is exposed to an intermediate range of high temperatures that is substantially higher than the ambient temperature range to which the inflator normally is subjected but substantially lower than the auto ignite temperature of the pyrotechnics of the inflator thereby to restrict the internal pressure that is allowed to build up in the inflator, upon exposure of the latter to a high temperature environment, to a range within the internal pressure capability of the inflator.

A more specific object of the invention is to provide such a device that is operative to cause the inflator pyrotechnics to function when the device is exposed to a temperature of approximately 350° F. (177° C.) in place of the 650° F. (343° C.) auto ignite temperature which would occur automatically in the absence of the device.

In accomplishing these and other objectives of the invention, there is provided an auto ignition or safety device comprising a container or housing that may be made of aluminum, and contains auto ignition material comprising granules of a standard gun powder that are selected to ignite at a temperature of approximately 350° F. (177° C.), and includes a foil seal. A cushion spacer may be provided to insure contact between the auto ignition material and the surface of the container for rapid heat transfer. An adhesive having high temperature properties up to the temperature of auto ignition of the device is provided for attaching the device to the inflator housing structure.

In operation, the combustion gases/particles, upon auto ignition, rupture the foil seal and rapidly ignite the pyrotechnics or gas generant composition in the inflator. One or two auto ignition devices may be used in a single inflator. When two devices are used, one may be located in the igniter chamber and the other in the combustion chamber. When only one device is used, it may be located either in the igniter chamber or the combustion chamber, as described hereinafter.

BRIEF DESCRIPTION OF THE DRAWING

Having summarized the invention, a detailed description of the invention follows with reference being made to the accompanying drawings which form part of the specification, of which.

DESCRIPTION OF THE PREFERRED EMBODIMENT

Figure 1:
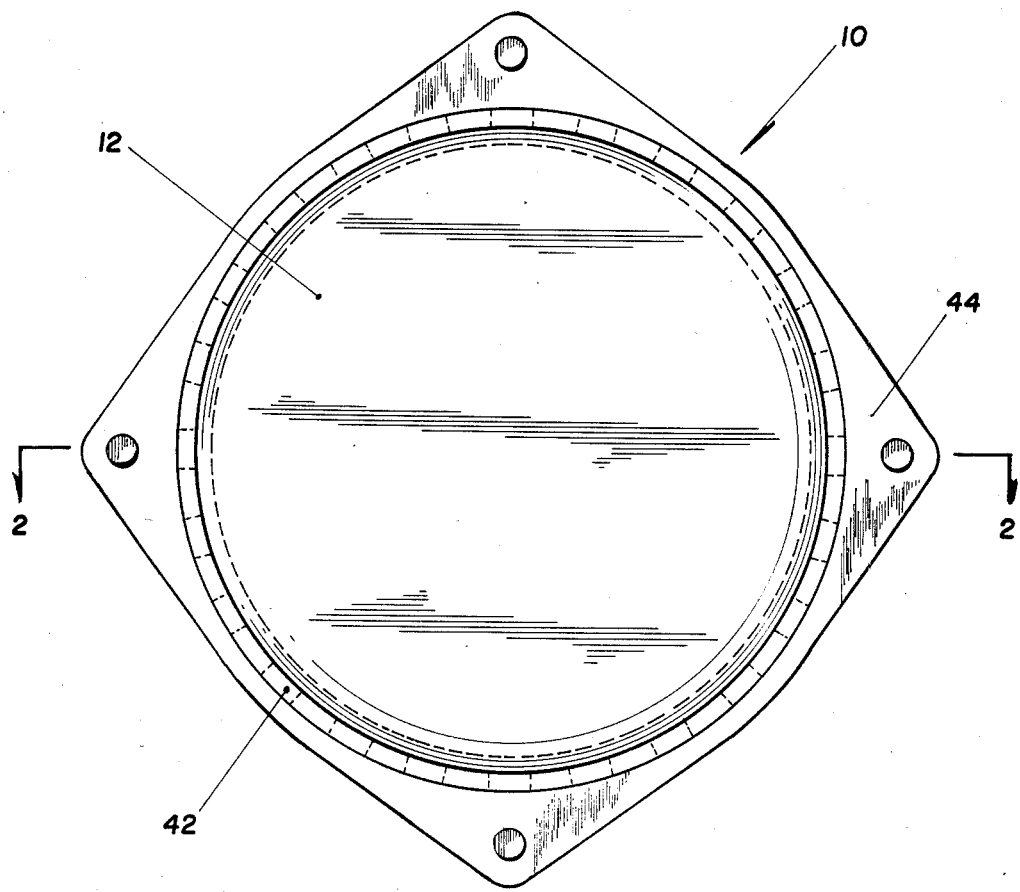
FIG. 1 is a plan view of an inflator incorporating the auto ignition device of the present invention.
Figure 2:
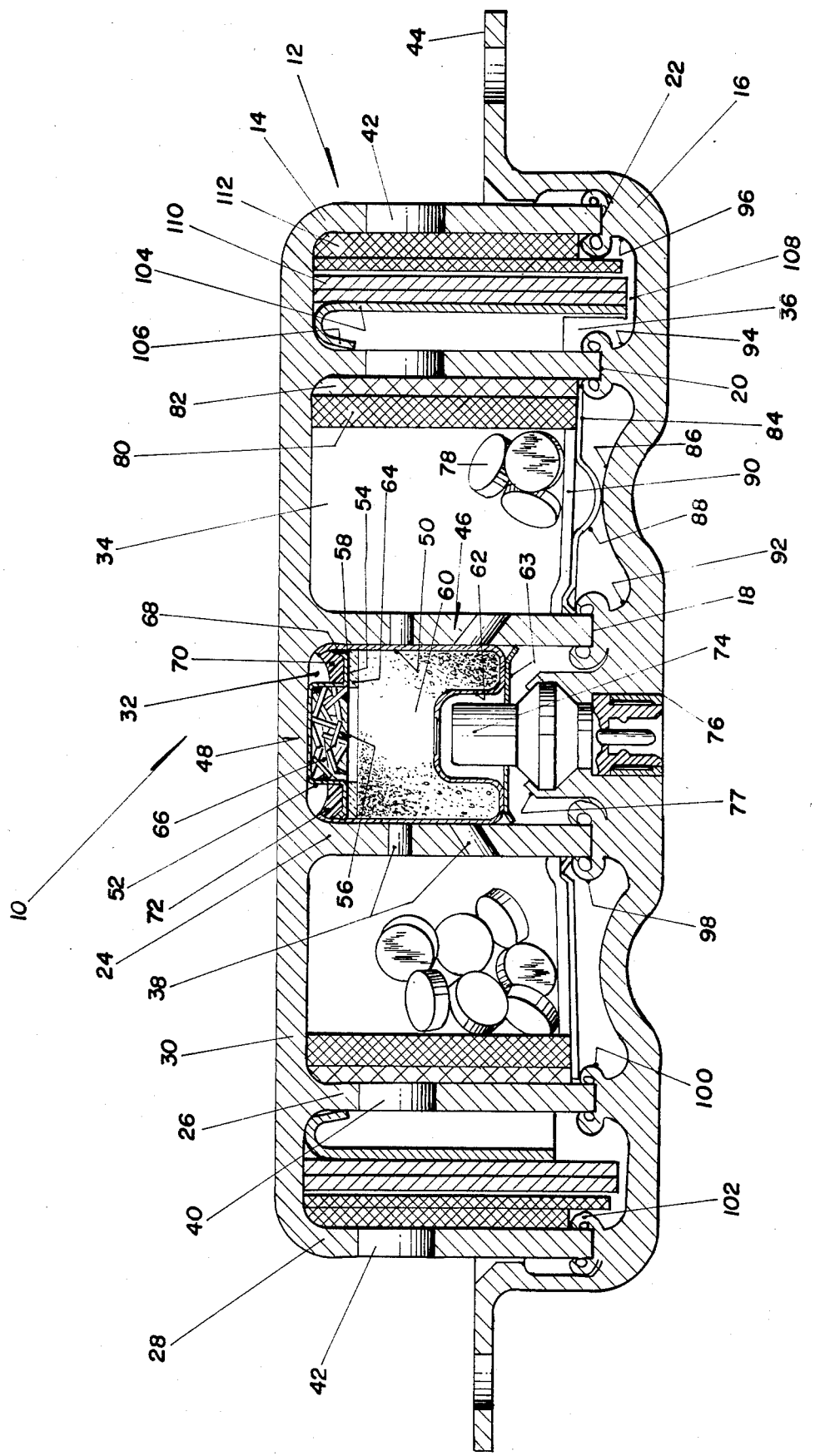
FIG. 2 is a cross sectional view of the inflator of FIG. 1 taken along the lines 2—2 of FIG. 1 showing the auto ignition device included in the igniter charge assembly.

The gas generator or inflator assembly 10 according to the present invention has a generally cylindrical external outline, as shown in FIGS. 1 and 2, and includes a housing construction 12 comprising two structural components. The two structural components, as shown in FIG. 2, comprise an upper shell or diffuser 14 and a lower shell or base 16 which are joined by three concentric inertia welds shown at 18, 20 and 22 to form the housing construction 12 of the inflator assembly 10. The three inertia welds 18, 20 and 22 are performed simultaneously in a single inertia welding operation.

The diffuser 14 may be formed by forging with three concentric cylinders 24, 26 and 28, each of which cylinders extend downwardly from a common flat upper wall 30 of the diffuser 14 to form a separate weld interface with the base 16. The inner cylinder 24, in cooperation with wall 30 and base 16, forms a cylindrical igniter chamber 32. The intermediate cylinder 26, in cooperation with the inner cylinder 24, wall 30, and base 16, forms an inner chamber having the shape of a toroid, specifically, a combustion chamber 34. The outer cylinder 28, in cooperation with the intermediate cylinder 26, wall 30, and base 16, forms an outer chamber 36 that also has the shape of a toroid. Cylinders 24, 26 and 28 each include a plurality of uniformly spaced exhaust openings or ports 38, 40 and 42, respectively, through which the generated or inflation gas flows into a protective air bag (not shown) to be filled. The base 16 includes an interface attachment flange 44 which is used to attach the inflator assembly 10 to a vehicle the occupants of which are to be protected.

Positioned within the igniter chamber 32 is an igniter charge assembly 46 having mounted therein a sub-assembly 48 which, for convenience, may be termed an auto ignition device. Igniter charge assembly 46 includes two cylindrical cups or containers, one designated 50 and the other 52, with the container 52 being hat shaped, including a brim and crown, and comprising part of the sub-assembly 48. As shown in FIG. 2, container 52 is positioned in an inverted and sealed manner in the end of container 50. The open end of container 52 is provided with a relatively wide brim, or flange, 54 and is sealed with an aluminum foil seal 56, the area of the foil seal 56 being bounded by the brim 54. Adhesive 58 may be provided for attaching seal 56 to the brim 54.

Container 50 may be made of aluminum and contains an igniter material 60. As shown, a recess or cavity 62 is formed in the bottom of container 50. The bottom of container 50 rests on a retaining ring 63 which is held in press fit engagement with the cylindrical wall surface of igniter chamber 32. Positioned between the igniting material 60 in container 50 and the flange 54 of container 52 is a perforated spacer pad 64, the opening in pad 64 being oppositely disposed with respect to foil seal 56 and being about the same in size. Spacer pad 64 desirably may be made of cerafiber.

Container 52 of the auto ignition device 48 contains an igniter material 66. For facilitating the insertion of container 52 into the open end of container 50 and effecting a close engagement with the inner wall surface of the latter, the outer peripheral edge 68 of brim of flange 54 desirably is rounded upwardly, as shown in the drawing. Sealing between the containers 50 and 52 may be effected by a suitable sealant 70 such as silicone rubber, properly cured in known manner. Desirably, the edge 72 of the open end of container 50 may be rounded inwardly, as shown, for enabling the igniter charge assembly 46 to conform to the shape of the igniter chamber 32 adjacent the diffuser wall 30, with the surface of container 52 remote from foil seal 56 in good thermal contact with the adjacent surface of wall 30 of diffuser 14.

Although various pyrotechnic materials may be employed for igniter material 60 in container 50, a preferred material is a granular mixture of 25% by weight of boron and 75% of potassium nitrate plus or minus 10% of lead azide. This mixture has been found to burn with a very hot flame that is suitable for igniting the solid fuel gas generant material employed in the inflator assembly 10, as described hereinafter.

The igniter material 66 in container 52 may be any granule, powder or other material which is stable for long duration at temperatures up to 250° F. (121° C.), will auto ignite at the desired temperature of approximately 350° F. (177° C.), and provide a hot gas/effluent output sufficient to ignite the igniter material 60 in container 50. An igniter material 66 that has been found to be satisfactory is Dupont 3031, a product of E. I. du Pont de Nemours & Co., Inc. of Wilmington, Del. Long duration stability is needed because of the expected longevity of use, which may be ten (10) years or more, of the vehicle in which the inflator 10 is to be installed.

The material of the housing of container 52 may be 0.010 to 0.020 inch (0.0254 to 0.0508 cm.) aluminum or steel foil. Adhesive 58 which is used to attach the aluminum foil seal 56 to the flange 54 on container 52 must have high temperature adhesive properties up to the temperature of auto ignition.

The purpose of the sub-assembly comprising auto ignition device 48 is to rapidly ignite the inflator 10 once the auto ignition temperature of the granules of the ignition material 66 is reached. The device 48 achieves this through the use of the granules of the ignition material 66 intimately contacting the wall 30 of housing shell 14 of the inflator 10, with the hot gaseous output thereof, upon auto ignition, being directed into the igniter material 60 in container 50.

Extending into recess 62 of container 50 is an initiator 74. Initiator 74, as shown, has a conically shaped lower portion and is mounted in a hole 76 having a mating conically shaped upper portion. Hole 76, as shown, is located at a central location in base 16. Initiator 74 is retained in hole 76 by a crimp 77 that is formed in base 16 at the upper end of hole 76 and which overlaps and engages the conically shaped upper portion of initiator 74. Initiator 74 may be a conventional electric squib having a pair of energizing electrical terminals (not shown) that are adapted for plug-in connection to external crash sensor means (not shown). A suitable adhesive may be provided for sealing initiator 74 in hole 76.

Contained within the toroidal combustion chamber 34 are uniformly distributed pellets 78 of a gas generant composition which may be any one of a number of compositions meeting the requirements of burning rate, nontoxicity, and flame temperature. One composition that may be utilized is that described in U.S. Pat. No. 4,203,787 to F. E. Schneiter and G. F. Kirchoff, Jr., which patent is assigned to assignee of the present invention. Another composition that may advantageously be utilized is that described in U.S. Pat. No. 4,369,079 granted to Graham C. Shaw, which patent also is assigned to the assignee of the present invention.

Pellets 78 are surrounded by an annular inner screen pack or combustion chamber filter 80. Inner screen pack 80, as shown in FIG. 2, may desirably include a layer 82 of coarse screen adjacent to the inner surface of concentric cylinder 26. An aluminum washer-shaped retaining ring or disk 84 holds the gas generant pellets 78 and inner screen pack 80 in place and away from the rotating base 16 during the inertia welding operation.

In the embodiment of the invention shown in FIG. 2, the internal surface of the base 16 includes a circular rounded ridge 86. This ridge 86 serves to reduce the free volume of combustion chamber 34. Additionally, during functioning of inflator assembly 10, ridge 86 provides support for the retaining disk 84. To that end several dimples may be provided on disk 84, one dimple 88 only being shown in the drawing. The dimples rest on ridge 86 of base 16. A soft or sponge-like pad 90 made of cerafiber may be provided between the disk 88 and the pellets 78 for holding the latter in place.

The concentric interface regions of base 16 that mate with the three concentric cylinders 24, 26 and 28 comprise short concentric-like stubs 92, 94 and 96, respectively. During the formation of the inertia welds 18, 20 and 22, flashing indicated, respectively, at 98, 100 and 102 is formed around the ends of the concentric cylinders 24, 26 and 28.

In the outer toroidal chamber 36, as seen in FIG. 2, an aluminum annular deflector ring 104 is provided. Deflector ring 104 is formed with an inwardly directed curved flange 106 at its upper end and is held in press fit engagement with the outer surface of cylinder 26 at the inner end thereof adjacent wall 30 of diffuser 14. The length of deflector ring 104 is such as to provide an annular exhaust opening or port 108 at the lower end thereof adjacent the flashing 102.

Also included in the toroidal chamber 36 is an outer screen pack or filter 110. Screen pack 110 may desirably include a coarse layer 112 adjacent the inner surface of cylinder 28.

The housing construction 12, as shown in FIGS. 1 and 2, provides a structure for containing the high pressure inflation gases which are produced by combustion of the gas generant pellets 78. Normal functioning of the inflator assembly 10 begins with an electrical signal from a crash sensor (not shown) to the initiator 74. The initiator 74 fires into and pierces the closed aluminum container 50 that holds the igniter material 60. The igniter material 60 burns and bursts through the walls of the container 50 and flows through the exit openings or ports 38 in the inner cylinder 24 and into the toroidal combustion chamber 34. The hot igniter gases ignite the gas generant pellets 78 which release the nitrogen inflator gases. These gases flow through the inner screen filter pack 80 and radially outward through the combustion chamber exit openings 40. The screen filter pack 80 serves to cool the inflator gases and to remove particulate residue therefrom. As the gases exit the combustion chamber openings 40, they are turned downward, as seen in FIG. 2, by deflector ring 104 where they strike flashing 100 from the intermediate cylinder inertia weld 20. The flashing 102 serves to interrupt the gas flow which helps to further remove particulate matter from the exhaust gases. The inflation gases then flow radially outward through the annular exhaust opening 108 and up into the annular space between deflector ring 104 and outer screen pack 110, through the latter, and finally radially outward through the exit openings or ports 42. The outer screen pack 110 serves further to cool the exhaust gases and to remove particulate matter.

In the event the inflator 10 is exposed to a high temperature environment, as described, the auto ignition device 48 functions to ignite the igniter material 60 and thereby cause a release of the gases from gas generant pellets 78 while the internal pressures within the inflator 10 are within the pressure capability of the housing construction 12.

The inflator assembly 10, as mentioned hereinbefore, is welded in the wholly loaded condition. During the inertia welding operation, the assembly of the loaded diffuser 14 containing the loaded and sealed igniter charge assembly 46, gas generant pellets 78, inner screen pack 80, retaining ring 84, deflector ring 104, and outer screen pack 110 is held stationary in the inertia welding machine. Aluminum retaining ring 84 holds the gas generant pellets 78 and inner screen pack 80 in place and also serves to keep them separated from the spinning base 16 during the inertia welding process.

In the inertia welding process, the base 16 is rotated beneath the loaded diffuser 14 by power driven clutch means (not shown) to a speed, typically of about 3000 r.p.m. Upon the attainment of such speed, the clutch is actuated to disconnect the power source and the freely spinning base 16 is raised upward to bring the concentric stubs 92, 94 and 96 into contact with the lower ends of a respectively associated one of the three concentric cylinders 24, 26 and 28 of the diffuser 14. The resulting friction stops the spinning in a fraction of a second of the base 16 but raises the temperature at the areas of contact sufficiently to cause consolidation thereat of the metal of the diffuser 14 and base 16. Pressure is maintained for a short period, for example, a second or two, to allow the welds 18, 20 and 22 to solidify.

During the welding process, flashing 98, 100 and 102 is created at the interface between the respective cylinders 24, 26 and 28 and the base 16. For improving the structural integrity of the welded assembly, the weld interface on the base 16, as shown in FIG. 2, is raised or "stubbed" away from the base inner surface 86. The weld flashing 98 from the inner cylinder 24 and the weld flashing 100 from the intermediate cylinder 26 are utilized to retain the aluminum retaining ring or disk 84 in place.

Figure 3:
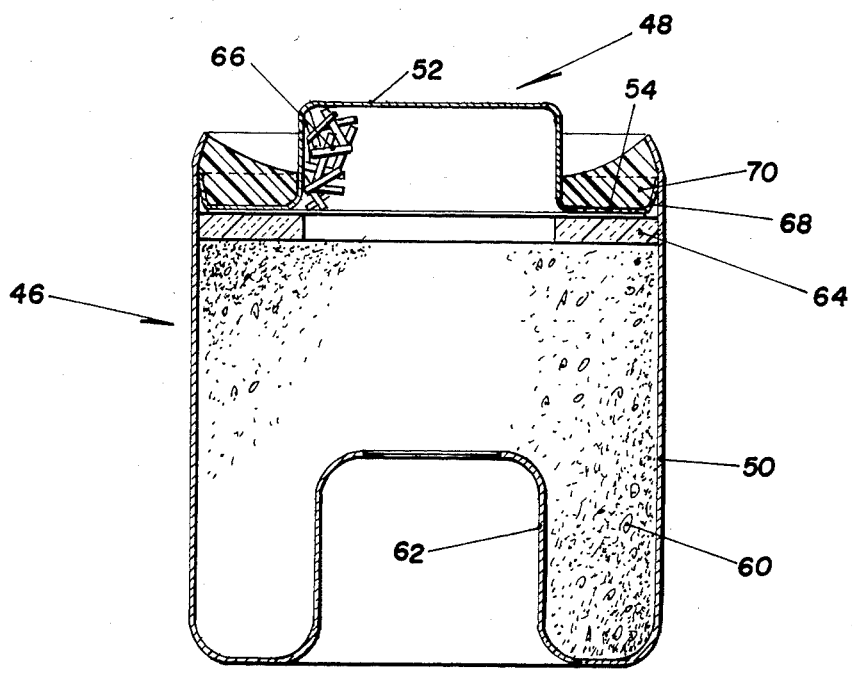
FIG. 3 is a cross sectional view showing the igniter charge assembly including the auto ignition device of FIG. 2 in greater detail.
Figure 4:
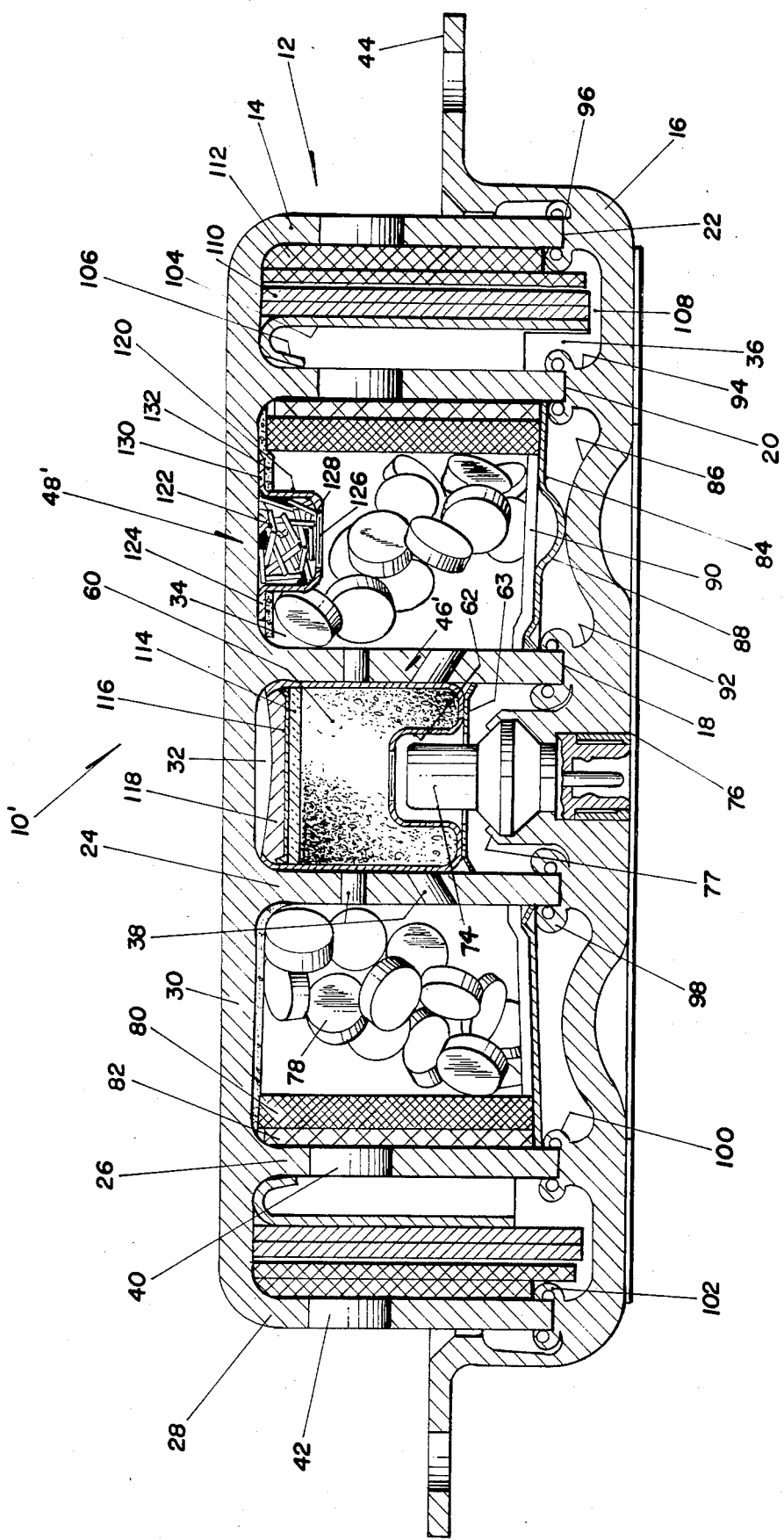
FIG. 4 is a cross sectional view of a modified form inflator according to the invention showing the auto ingition device located in the combustion chamber.

In FIG. 4 there is illustrated a modification of the auto ignition device of the present invention and an application thereof in an inflator for the inflation of inflatable crash protection restraint systems. The inflator assembly, designated 10', in FIG. 4 may correspond in all respects to the inflator assembly 10 of FIGS. 1, 2 and 3 except that the igniter charge assembly 46' of FIG. 4 does not include therein the sub-assembly comprising the auto ignition device 48, the auto ignition device 48' in FIG. 4 being contained in the combustion chamber 34 instead.

As shown in FIG. 4, the igniter material 60 in container 50 is held therein by a spacer pad 114 and a retaining disk 116. Pad 114 and disk 116 are both solid, that is, they are not perforated as is the spacer pad 64 of FIG. 2. A sealant 118 is provided, as shown in FIG. 4, to seal the open end of the container 50 and the material contained therein.

The auto ignition device 48' in FIG. 4 comprises a hat shaped container 120 and contains an igniter material 122. Igniter material 122 may be identical to the igniter material 66 of FIG. 2. Hat shaped container 120 includes a wide brim 124 and the crown thereof is perforated. The perforation in the crown of container 120 is sealed by an aluminum foil seal 126 which is attached thereto by a suitable adhesive 128. The brim 124 of container 120 is attached to the inner surface of wall 30 in combustion chamber 34 by a suitable adhesive 130. Adhesives 128 and 130, similar to adhesive 58 of FIG. 2, must each have high temperature properties up to the temperature of auto ignition. A soft pad 132 of cerafiber may be provided between the pellets 78 and the brim 124 of container 120. The pad 132 may also extend between wall 30 and the adjacent end of the filter 80.

As with the inflator assembly 10 of FIGS. 1, 2 and 3, normal functioning of the inflator assembly 10' begins with an electrical signal from a crash sensor (not shown) to the initiator 74. Firing of the initiator 74 causes ignition of the igniter material 60 which burns and bursts through the walls of the container 50 and flows through the exit openings or ports 38 in the inner cylinder 24 and into the toroidal chamber 34. This causes ignition of the pellets 78 and thereby release of the nitrogen inflator gases. These gases are filtered by the inner screen filter pack 80 and flow radially outward through the combustion chamber openings or ports 40. The gases exiting ports 40 are deflected downward, as seen in FIG. 4, by deflector ring 104 and strike flashing 100 which results in further removal of particulate matter from the gases. The gases then flow radially outward through the annular exhaust opening 108 and up into the annular space between deflector ring 104 and the outer screen pack 110, through the screen pack 110 and then radially outward through the exit ports 42.

The purpose of the auto ignition device 48' in FIG. 4 is the same as the auto ignition device 48 in the embodiment of FIGS. 1, 2 and 3, namely to cause the inflator assembly 10' to function in the event the device 48' is subjected to a high temperature environment such as a bonfire, at a temperature of approximately 350° F. (177° C.) in place of in the 650° F. (343° C.) range which would occur due to auto ignition of pellets 78 if the auto ignition device 48' were not provided. The device 48' achieves this through the use of the granules of the igniter material 122 intimately contacting the wall 30 of housing shell 14 of inflator 10', with the hot gaseous output of the material 122 bursting through foil seal 126 and being directed onto the gas generant pellets 78 in the combustion chamber 34.

Thus, there has been provided, in accordance with the invention, a practical and efficient solution to the problem, aforementioned, that is encountered when the housing structure of an inflator is designed to lower internal pressure capability in order to minimize weight as, for example, by the utilization of aluminum in place of steel in the construction of the housing. The solution is made possible by the use in the inflator of a novel auto ignition device that is operative to cause the inflator pyrotechnics to function when the auto ignition device is subjected to a high temperature environment at a temperature of about 350° F. (177° C.), for example, in place of in the 650° F. (343° C.) auto ignite temperature which would occur if there were no auto ignition device. The auto ignition device of the invention may thus be utilized to restrict the internal pressures that are allowed to build up in the inflator, upon exposure thereof to a high temperature environment, to a range within the internal pressure capability of the inflator. The invention has particular utility for use in inflators in which aluminum has been used in place of steel for the housing structure in order to minimize weight where the aluminum has sufficient high temperature properties to contain the internal auto ignition pressures at 350° F. (177° C.) but not at 650° F. (343° C.).

What is claimed is:

1. The combination of
   an inflator for the generation of a gas to inflate a vehicle passive restraining crash protection bag, and
   an auto ignition device,
   said inflator having a housing structure containing a gas generant composition which when ignited generates a gas for the inflation of the crash protection bag, ignition means for igniting said gas generant composition responsively to the onset of a crash of the vehicle in which said inflator is mounted, and filter means, said housing structure having ports therein for the passage of gas generated by said gas generant composition exteriorly of said inflator, said gas generant composition being characterized in automatically igniting when subjected to a predetermined high temperature that is substantially higher than the ambient temperature range to which said inflator normally is subjected, said housing structure, in order to minimize weight, being made of a material that degrades at said predetermined high temperature and thus has insufficient high temperature properties to contain the internal automatic ignition pressures that tend to be developed in said housing structure at said predetermined high temperature, said housing structure having sufficient high temperature properties to contain the internal pressures within a range of high temperatures that is intermediate the said ambient temperature range and said predetermined high temperature, and
   an auto ignition device contained within said housing structure in good thermal contact therewith for causing said gas generant composition to be ignited and thereby the inflator to function when said device is subjected to a predetermined temperature within said intermediate range of high temperatures.

2. The combination as defined in claim 1 wherein said auto ignition device comprises a container having walls and an integral portion thereof in intimate contact with said inflator housing structure, said container containing an igniter material that is adapted to auto ignite when subjected to said predetermined temperature within said intermediate range of high temperatures, with a portion at least of one of said container walls comprising a foil seal that is adapted to burst upon auto ignition of said ignition materials thereby to direct the gaseous output thereof for causing said gas generant composition to be ignited.

3. The combination as defined in claim 2 wherein said container of said auto ignition device is hat shaped and includes a brim and a crown with said crown being attached in good thermal contacting relation to said inflator housing structure and with the area of a wall of said container bounded by said brim being closed by said foil seal.

4. The combination as defined by claim 3 wherein the area of said hat shaped container bounded by said brim and including said foil seal is positioned in close proximity to said ignition means for igniting said gas generant composition whereby upon auto ignition of said igniter material, and bursting of said foil seal, the hot gaseous output of said igniter material is directed directly into said ignition means and is operative thereby to cause ignition of said gas generant composition.

5. The combination as defined in claim 2 wherein said container of said auto ignition device is hat shaped and includes a brim and a crown with said brim being attached in good thermal contacting relation to said inflator housing structure and with said crown having a perforation therein that is closed by said foil seal.

6. The combination as defined in claim 5 wherein the crown of said hat shaped container is positioned in close proximity to said gas generant composition whereby upon auto ignition of said igniter material and bursting of said foil seal, the hot gaseous output thereof is directed directly into said gas generant composition and is operative to ignite said gas generant composition.

7. The combination as defined in claim 2 wherein said gas generant composition is characterized in automatically igniting at a temperature of about 650° F. (343° C.) and said igniter material is characterized in automatically igniting at a temperature of about 350° F. (177° C.).

8. The combination as defined in claim 7 wherein said igniter material is further characterized in being stable for long duration at temperatures up to 250° F. (121° C.).

* * * * *